United States Patent
Tang et al.

(10) Patent No.: US 10,866,334 B2
(45) Date of Patent: Dec. 15, 2020

(54) DEVICES FOR LAYING OUT PREFABRICATED MAGNETIC FIELD AND METHODS OF RESPONDING STATE OF SLIP MASS

(71) Applicant: CHINA UNIVERSITY OF GEOSCIENCES (WUHAN), Wuhan (CN)

(72) Inventors: Huiming Tang, Wuhan (CN); Junrong Zhang, Wuhan (CN); Changdong Li, Wuhan (CN); Xinli Hu, Wuhan (CN); Liangqing Wang, Wuhan (CN); Guangchang Zhang, Wuhan (CN); Wenping Gong, Wuhan (CN); Yiping Wu, Wuhan (CN); Yongquan Zhang, Wuhan (CN); Lei Huang, Wuhan (CN); Junwei Ma, Wuhan (CN); Zongxing Zou, Wuhan (CN); Sha Lu, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 112 days.

(21) Appl. No.: 16/183,762

(22) Filed: Nov. 8, 2018

(65) Prior Publication Data
US 2020/0073005 A1     Mar. 5, 2020

(30) Foreign Application Priority Data
Aug. 31, 2018   (CN) .......................... 2018 1 1013277

(51) Int. Cl.
*G01R 31/00*    (2006.01)
*G01V 3/08*     (2006.01)

(52) U.S. Cl.
CPC ..................................... *G01V 3/08* (2013.01)

(58) Field of Classification Search
USPC ................................ 324/303, 338, 339, 366
See application file for complete search history.

(56) References Cited

U.S. PATENT DOCUMENTS

| | | | | |
|---|---|---|---|---|
| 4,953,136 A | * | 8/1990 | Kamata | .................... G01V 1/16 367/25 |
| 2012/0126993 A1 | * | 5/2012 | Samson | ................. G01V 1/003 340/854.8 |
| 2017/0173914 A1 | * | 6/2017 | Yamada | ................ B31F 1/2895 |

* cited by examiner

Primary Examiner — Vincent Q Nguyen
(74) Attorney, Agent, or Firm — Hemisphere Law, PLLC; Zhigang Ma (57) ABSTRACT

The present disclosure relates to a device for laying out a prefabricated magnetic field and a method for responding state of a slip mass in the prefabricated magnetic field. The device may include a traction mechanism, a control mechanism and a layout probe. The layout probe may include a shell, a circuit board and at least one set of layout mechanism equipped in the shell. The layout mechanism may include a cartridge, a screw pole, an electromagnet, a driving mechanism and a pressing mechanism. The traction mechanism may lay down the layout probe to a default location of a drill hole. The control mechanism may control the driving mechanism to transmit an uppermost permanent-magnet in the layout probe to the cartridge nozzle and be attracted by the electromagnet. The pressing mechanism may move the electromagnet which presses the permanent-magnet in the inner wall of the drill hole.

14 Claims, 6 Drawing Sheets

DEVICES FOR LAYING OUT PREFABRICATED MAGNETIC FIELD AND METHODS OF RESPONDING STATE OF SLIP MASS

CROSS REFERENCE TO RELATED APPLICATION

This application claims the priority of Chinese Patent Application No. 201811013277.2, entitled "Devices for Laying out Prefabricated Magnetic Field and Methods of Responding State of Slip Mass", filed on Aug. 31, 2018, the disclosure of which is incorporated herein by reference in its entirety.

BACKGROUND OF THE INVENTION

1. Field of the Invention

The invention relates to the field of geological disasters prevention and monitoring, and particularly to devices for laying out a prefabricated magnetic field and methods of responding state of a slip mass.

2. Description of Related Art

Casualties, buried roads, damaged houses and other catastrophic losses caused by the landslides threaten the economic production safety of human society seriously. In order to reduce the loss and the threat caused by the landslides, some semi-active preventive disaster reduction measuring technology, such as monitoring and warning, are adopted. Displacement, including surface displacement and deep displacement of the landslides, is an important monitoring object of the landslide.

There are many methods of monitoring the landslide surface displacement, but the methods of monitoring the landslide deep displacement are few. The embedded optical fiber, coaxial cable (TDR, OTDR, BOTDR) and other monitoring equipments have low reliability and are easy to be cut off. The guyed displacement meter, such as the slip plane type, has many advantages, but its sensitivity is low due to the limitation of the setting mode and the defects of the hypothesis model. The survey technology is a widely accepted method of monitoring the landslide deformation for its high precision and good reliability, but it has the problem of the inclined pipe-soil coupling deformation. In addition, China Three Gorges University has proposed several monitoring methods of underground displacement based on borehole magnetic positioning, which lack the consideration that the underground space would change the power supply environment of the magnetic detector after the sliding body deformation.

The study shows that tracking and monitoring the deformation characteristics in the creep process before the sliding body is destroyed is helpful to clarify and determine the development trend of the landslide displacement at different stages, and to enrich and verify the existing methods of predicting the landslide. However, because the existing monitoring methods are limited by the design of methods or instruments, it is hard to monitor the large deformation and long-term deformation of the landslide continuously, and it cannot take the inclined pipe-soil coupling deformation in borehole into account.

SUMMARY OF THE INVENTION

One aspect of the present disclosure relates to a device for laying out a prefabricated magnetic field, including a traction mechanism, which is set outside a drill hole, configured to lift or lay down a layout probe to one or more preset positions in the drill hole; the layout probe, which is set in the drill hole, configured to lay out one or more monitoring points, wherein the layout probe includes a circuit board and at least one set of layout mechanism, wherein the set of layout mechanism comprises a cartridge configured to store at least one permanent-magnet, a screw pole configured to transmit the permanent-magnet, an electromagnet configured to attract the permanent-magnet, a driving mechanism configured to drive the screw pole to rotate and a pressing mechanism configured to move the electromagnet, wherein the cartridge comprises a transmission slot aligned with the screw pole and a cartridge nozzle aligned with the electromagnet, wherein the pressing mechanism is fixed above the screw pole and connected with the electromagnet; and a control mechanism, which is set outside the drill hole, configured to perform operations comprising: driving the screw pole to rotate by controlling the driving mechanism, which makes permanent-magnets rise upwardly in the transmission slot, and an uppermost permanent-magnet is discharged from the cartridge nozzle and is attracted by the electromagnet by electrifying the electromagnet; pushing the electromagnet outward by controlling the pressing mechanism, which makes the permanent-magnet be pressed in inner wall the drill hole.

In some embodiments, the traction mechanism is an electric winch, which is electrically connected with the control mechanism.

In some embodiments, the traction mechanism includes a traction rope configured to connect with the layout probe, and the traction rope includes one or more digital sequence marks.

In some embodiments, the pressing mechanism is a hydraulic jack, which is connected with a hydraulic oil pump through hydraulic tubing, the hydraulic oil pump is electrically connected with the control mechanism, and the control mechanism moves the pressing mechanism forwardly or backwardly by controlling the hydraulic oil pump.

In some embodiments, the circuit board is connected with the control mechanism via a control cable.

In some embodiments, the digital sequence mark is a plastic ring, and the plastic ring rings the traction rope, the hydraulic tubing and the control cable.

In some embodiments, two adjacent plastic rings are evenly spaced on the traction rope.

In some embodiments, the cartridge is a hollow tube, and a bullet hole is defined in middle part of the hollow tube.

In some embodiments, a spring is fixed at bottom of the cartridge, and a supporting plate is fixed on an upper free end of the spring.

In some embodiments, an upper end of the cartridge is the cartridge nozzle; and a plurality of permanent-magnets is filled between the supporting plate and the cartridge nozzle.

In some embodiments, the layout probe includes three sets of layout mechanisms, and the three pressing mechanisms of the three sets of layout mechanisms are distributed evenly around a circle.

In some embodiments, an electromagnetic relay is installed on the circuit board, the electromagnetic relay is connected with the electromagnet, and the circuit board electrifies the electromagnet via the electromagnetic relay and the permanent-magnet is attracted by the electromagnet.

In some embodiments, the driving mechanism is a slow turning motor which is connected with the circuit board.

Another aspect of the present disclosure relates a device for responding state of a slip mass in a prefabricated magnetic field, including a traction mechanism, which is set outside a drill hole, configured to lift or lay down a layout probe to one or more preset positions in the drill hole; the layout probe, which is set in the drill hole, configured to lay out one or more monitoring points, wherein the layout probe includes a circuit board and at least one set of layout mechanism, wherein the set of layout mechanism includes a cartridge configured to store at least one permanent-magnet, a screw pole configured to transmit the permanent-magnet, an electromagnet configured to attract the permanent-magnet, a driving mechanism configured to drive the screw pole to rotate and a pressing mechanism configured to move the electromagnet, wherein the cartridge includes a transmission slot aligned with the screw pole and a cartridge nozzle aligned with the electromagnet, wherein the pressing mechanism is fixed above the screw pole and connected with the electromagnet; and a control mechanism, which is set outside the drill hole, configured to perform operations comprising: driving the screw pole to rotate by controlling the driving mechanism, which makes permanent-magnets rise upwardly in the transmission slot, and an uppermost permanent-magnet is discharged from the cartridge nozzle and is attracted by the electromagnet by electrifying the electromagnet; pushing the electromagnet outward by controlling the pressing mechanism, which makes the permanent-magnet be pressed in inner wall the drill hole, and a detection mechanism, configured to detecting spatial position of the permanent-magnet, wherein the detection mechanism includes an inclinometer configured to store a permeameter, the permeameter configured to detect magnetic signals of the permanent-magnets at the preset monitoring points, a data processor configured to transform the magnetic signals of the permanent-magnets into digital signals, a signal projector configured to transmit the digital signals to a terminal, and the terminal configured to confirm the spatial position of each permanent-magnet.

Another aspect of the present disclosure relates to a method for responding state of a slip mass in a prefabricated magnetic field, including: step S1: drilling a drill hole from earth surface of a slip mass until a slip zone of the slip mass, which is located above a stabilized stratum of the slip mass, is achieved, and laying down a layout probe in the drill hole until the layout probe is located on the slip zone, and confirming a position of the slip zone; step S2: placing a permanent-magnet stored in the layout probe into inner wall of the drill hole, and confirming the permanent-magnet in the inner wall of the drill hole as a monitoring point; step S3: lifting the layout probe and repeating the step S2 several times until all preset monitoring points have been confirmed; step S4: numbering all of monitoring points in the inner wall of the drill hole after all of the preset monitoring points have been confirmed; and step S5: confirming spatial position of each permanent-magnet and change of the spatial position of each preset monitoring point by detecting magnetic signals of all of permanent-magnets in the inner wall of the drill hole.

In some embodiments, the step S4 further including: if the permanent-magnets in the layout probe is used up, lifting the layout probe from the drill hole, and placing some permanent-magnets in the layout probe, and laying down the layout probe to the same position before it was lifted.

In some embodiments, the step S5 further including: placing an inclinometer in the drill hole, and filling materials similar to ground around the inclinometer to keep environment of the drill hole stable.

In some embodiments, the inclinometer includes a permeameter located therein.

In some embodiments, the permeameter is connected with a processor and a signal projector through a communication cable, the processor and the signal projector are outside the drill hole, magnetic signals of the permanent-magnets at the preset monitoring points are detected by the permeameter, and the magnetic signals of the permanent-magnets are transformed into digital signals by the data processor.

In some embodiments, the digital signals are transmitted to the terminal by the signal projector, the spatial position of each permanent-magnet is confirmed by the terminal, and the change of the spatial position of each preset monitoring point may be confirmed based on the change of the spatial position of each permanent-magnet.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

In order to more clearly illustrate technical solutions of embodiments of the invention or the prior art, drawings will be used in the description of embodiments or the prior art will be given a brief description below. Apparently, the drawings in the following description only are some of embodiments of the invention, the ordinary skill in the art can obtain other drawings according to these illustrated drawings without creative effort.

Wherein: 1—power line, 2—traction mechanism, 3—plastic ring, 4—hydraulic oil pump, 5—control mechanism, 6—power supply, 7—control cable, 8—layout probe, 9—hydraulic tubing, 10—permanent-magnet, 11—permeameter, 12—inclinometer, 13—slip mass, 14—slip zone, 15—stabilized stratum, 16—circuit board, 17—electromagnetic relay, 18—hole, 19—output hole, 20—screw pole, 21—transmission shaft, 22—driving mechanism, 23—counterweight part, 24—shell, 25—bolt, 26—pressing mechanism, 27—electromagnet, 28—cartridge nozzle, 29—cartridge, 30—bullet hole, 31—supporting plate, 32—spring, 33—transmission slot, 34—separation plate, 35—communication cable, 36—groove, 37—thread, 38—traction rope, 39—layout mechanism, 40—detection mechanism, 41—data processor, 42—signal projector, 43—terminal, 201—drill hole, 261—shaft.

DETAILED DESCRIPTION OF THE PREFERRED EMBODIMENTS

In accordance with various implementations, as described in more detail below, mechanisms, which can include devices for laying out prefabricated magnetic field and methods of responding the state of a slip mass are provided.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "sub-unit" "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises." and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The present disclosure relates to geological disasters prevention and monitoring. Specially, the present disclosure relates to devices for laying out a prefabricated magnetic field and methods of responding state of a slip mass.

Figure 1:
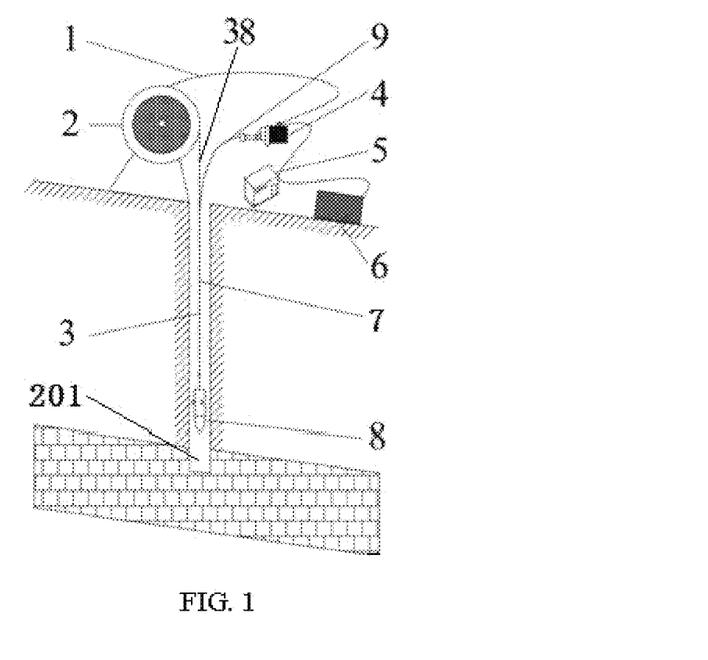
FIG. 1 is a schematic diagram of an exemplary device for laying out prefabricated magnetic field according to some embodiments of the present disclosure.

FIG. 1 is a schematic diagram of an exemplary device for laying out the prefabricated magnetic field according to some embodiments of the present disclosure. As illustrated, the prefabricated magnetic field lay out device may include a traction mechanism 2 which may be set outside a drill hole 201, a control mechanism 5 which may be set outside the drill hole 201, a layout probe 8 which may be set in the drill hole 201, and/or any other suitable component for laying out prefabricated magnetic field in accordance with various embodiments of the disclosure. The layout probe 8 may be connected to the traction mechanism 2, which may be configured to lift or lay down the layout probe 8 to one or more preset positions in the drill hole 201. The layout probe 8 may be configured to lay out one or more monitoring points in the drill hole 201.

In some embodiments, the traction mechanism 2 maybe an electric winch, which may be electrically connected with the control mechanism 5. The control mechanism 5 may include a power supply 6. The power supply 6 may be electrically connected with the traction mechanism 2 through a power line 1 to provide power to the traction mechanism 2. The traction mechanism 2 may include a traction rope 38, which may be connected with the layout probe 8. The control mechanism 5 may lift or lay down the layout probe 8 to one or more preset positions in the drill hole 201 by controlling the traction mechanism 2.

There may be a number of plastic rings 3 which are evenly spaced on the traction rope 38. The plastic ring 3 maybe a tick mark of the traction rope 38, and the plastic ring 3 may include a number of digital sequence marks. In some embodiments, distance of two adjacent plastic rings 3 is 0.5 meter. Each plastic ring 3 may ring the traction rope 38, a hydraulic tubing 9 and a control cable 7.

Figure 2:
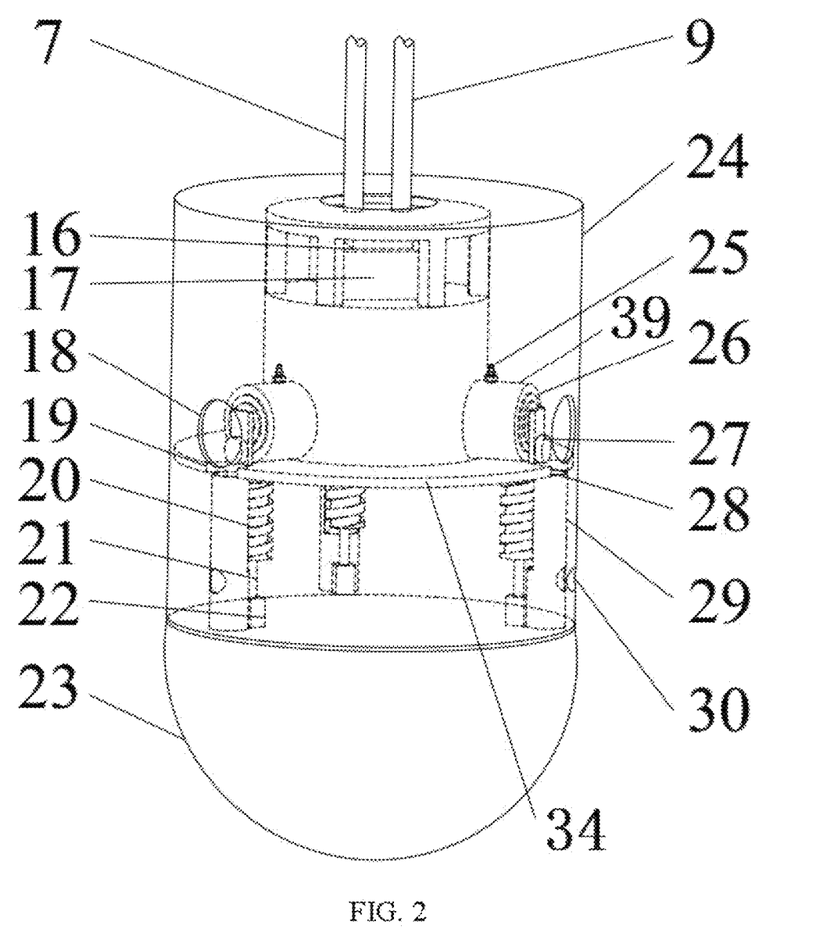
FIG. 2 is a schematic diagram of an exemplary layout probe in FIG. 1 according to some embodiments of the present disclosure.

FIG. 2 is a schematic diagram of an exemplary layout probe 8 in FIG. 1 according to some embodiments of the present disclosure. The layout probe 8 may include a shell 24 and a counterweight part 23. The counterweight part 23 may be configured to keep the layout probe 8 in a stable state while working. In some embodiments, the counterweight part 23 may be fixed at the bottom of the shell 24.

There may be a circuit board 16 and at least one set of layout mechanism 39 inside the shell 24. In some embodiments, there may be three sets of layout mechanisms 39 inside the shell 24, and the three sets of layout mechanisms 39 may be uniform distributed in a circle. There may be an electromagnetic relay 17 under the circuit board 16. The inner middle part of the shell 24 may be fixed with a separation plate 34. The circuit board 16 may be fixed on the separation plate 34 and be connected with the control mechanism 5 via the control cable 7.

Figure 3:
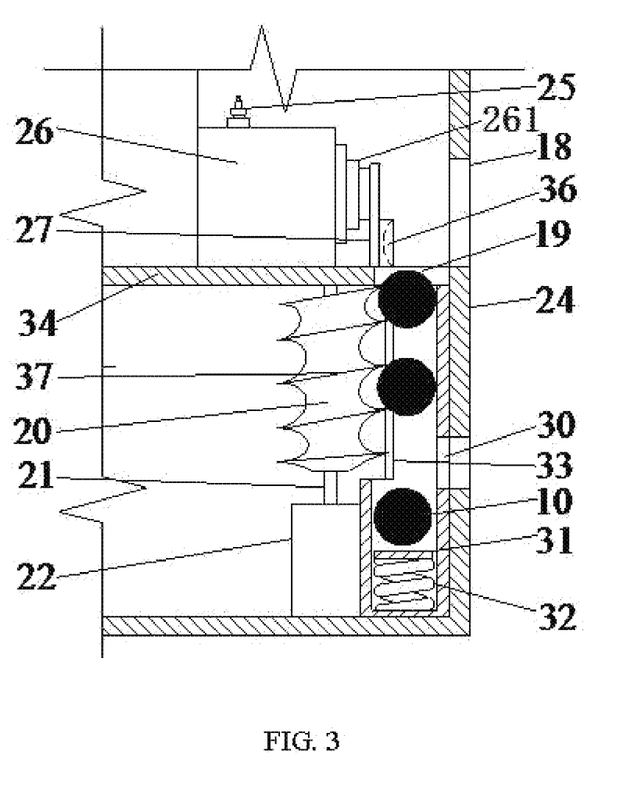
FIG. 3 is a schematic diagram of an exemplary layout mechanism in FIG. 2 according to some embodiments of the present disclosure.
Figure 4:
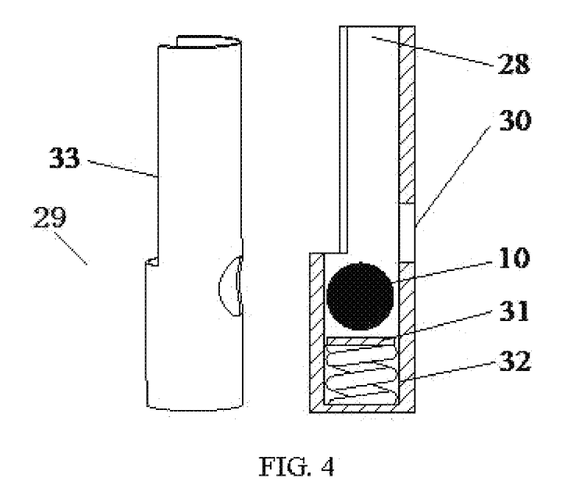
FIG. 4 is a schematic diagram of an exemplary cartridge in FIG. 2 according to some embodiments of the present disclosure.

FIG. 3 is a schematic diagram of an exemplary layout mechanism 39 in FIG. 2 according to some embodiments of the present disclosure. FIG. 4 is a schematic diagram of an exemplary cartridge 29 in FIG. 2 according to some embodiments of the present disclosure. Each set of layout mechanism 39 may include a cartridge 29 which may be configured to store at least one permanent-magnet 10, a screw pole 20 which may be configured to transmit the permanent-magnet 10, an electromagnet 27 which may be configured to attract the permanent-magnet 10, a driving mechanism 22 which may be configured to drive the screw pole 20 to rotate, and a pressing mechanism 26 which may be configured to move the electromagnet 27.

In some embodiments, the cartridge 29 may be a hollow tube with a closed bottom nozzle. An upper end of the cartridge 29 may be a cartridge nozzle 28. The cartridge 29 may be fixed on the inner wall of the shell 24. An upper portion of one side of the cartridge 29 may be cut lengthways to form a transmission slot 33 which may be adjacent to the screw pole 20. The middle part of another side of the cartridge 29 may define a bullet hole 30. In some embodiments, a cross section of the transmission slot 33 may be a sector of 180-270 degree. The bullet hole 30 may penetrate through lateral wall of the shell 24. A spring 32 may be fixed at the bottom of inner side of the cartridge 29. A supporting plate 31 may be fixed on an upper free end of the spring 32. A plurality of permanent-magnets 10 may be filled in the cartridge 29 through the cartridge nozzle 28 and located on the supporting plate 31 one by one. In some embodiments, the permanent-magnets 10 may be spherical. A part of the permanent-magnet 10 may be accommodated in the transmission slot 33, so that the permanent-magnet 10 may be fully confined in the cartridge 29. Another part of the permanent-magnet 10 may be beyond the transmission slot 33, so that the permanent-magnet 10 may cooperate with transmission of the screw pole 20.

In some embodiments, the driving mechanism 22 may include a slow turning motor, a hydraulic motor, or the like, or a combination thereof. There may has thread 37 on the outside of the screw pole 20. In some embodiments, the pitch of the thread 37 may be equal to or less than the diameter of the permanent-magnet 10. The bottom of the screw pole 20 may be connected with the upper end of a transmission shaft 21. The bottom of the transmission shaft 21 may be connected with the driving mechanism 22. The driving mechanism 22 may be fixed in the inner surface of the shell 24. The screw pole 20 may be aligned with the transmission slot 33, so that the part of the permanent-magnet 10 which may be beyond the transmission slot 33 may be accommodated between two adjacent threads of the thread 37. The driving mechanism 22 may drive the screw pole 20 to rotate, which makes the permanent-magnets 10 to be raised upwardly in the transmission slot 33 until the uppermost permanent-magnet 10 may be discharged from the cartridge nozzle 28 to be aligned to the electromagnet 27.

The cartridge nozzle 28 may be located below and adjacent to the electromagnet 27. In some embodiments, the pressing mechanism 26 may be a hydraulic jack. The pressing mechanism 26 may be fixed on the separation plate 34 horizontally through a bolt 25. The pressing mechanism 26 may include a shaft 261 which mounts the electromagnet 27 thereon. An outside of the electromagnet 27 may define a groove 36. The permanent-magnets 10 may be fixed in the groove 36 by the magnetic force of the electromagnet 27.

A hole 18 may be defined in a side of the shell 24 to be aligned to the groove 36. An output hole 19 may be defined on the cartridge nozzle 28. The uppermost permanent-magnet 10 in the cartridge 29 discharged from the cartridge nozzle 28 may be attracted by the electromagnet 27 in the guide of the output hole 19.

The pressing mechanism 26 may be connected with a hydraulic oil pump 4 through the hydraulic tubing 9. The hydraulic oil pump 4 may be set out of the drill hole 201, and be electrically connected with the power supply 6. The shaft 261 of the pressing mechanism 26 maybe moved forwardly or backwardly through the control mechanism 5 controlling the hydraulic oil pump 4. In some embodiments, three pressing mechanisms 26 of the three sets of layout mechanisms 39 may be distributed evenly around a circle (e.g., the center of the separation plate 34), so that the three sets of layout mechanisms 39 may be distributed evenly in the shell 24. The electromagnet 27 may be connected with the electromagnetic relay 17, and the circuit board 16 may control the electromagnet 27 via the electromagnetic relay 17. The electromagnet 27 may attract the permanent-magnet 10 by energizing the electromagnet 27, or release the permanent-magnet 10 by outage.

While laying out a monitoring point in the drill hole 201, firstly, the control mechanism 5 may lift or lay down the layout probe 8 to a default location of the drill hole 201 by controlling the traction mechanism 2. Secondly, the control mechanism 5 may control the driving mechanism 22 drive the screw pole 20 to rotate and the electromagnetic relay 17 to connect with the electromagnet 27 by controlling the circuit board 16. So that, the uppermost permanent-magnet 10 in the transmission slot 33 may be transmitted to the cartridge nozzle 28 and be attracted by the electromagnet 27. Thirdly, the control mechanism 5 may control the hydraulic oil pump 4 works, so that hydraulic oil of the hydraulic oil pump 4 may enter into the pressing mechanism 26 via the hydraulic tubing 9 to drive the pressing mechanism 26 moving. The output end of the pressing mechanism 26 may move across the hole 18 to press the permanent-magnet 10 into inner wall of the drill hole 201. Fourthly, the control mechanism 5 may control the outage of the electromagnet 27 via the electromagnetic relay 17, and the permanent-magnet 10 may be released from the electromagnet 27. At last, the pressing mechanism 26 may be retracted, and the permanent-magnet 10 may be located in the inner wall of the drill hole 201 to work as the monitoring point.

Figure 5:
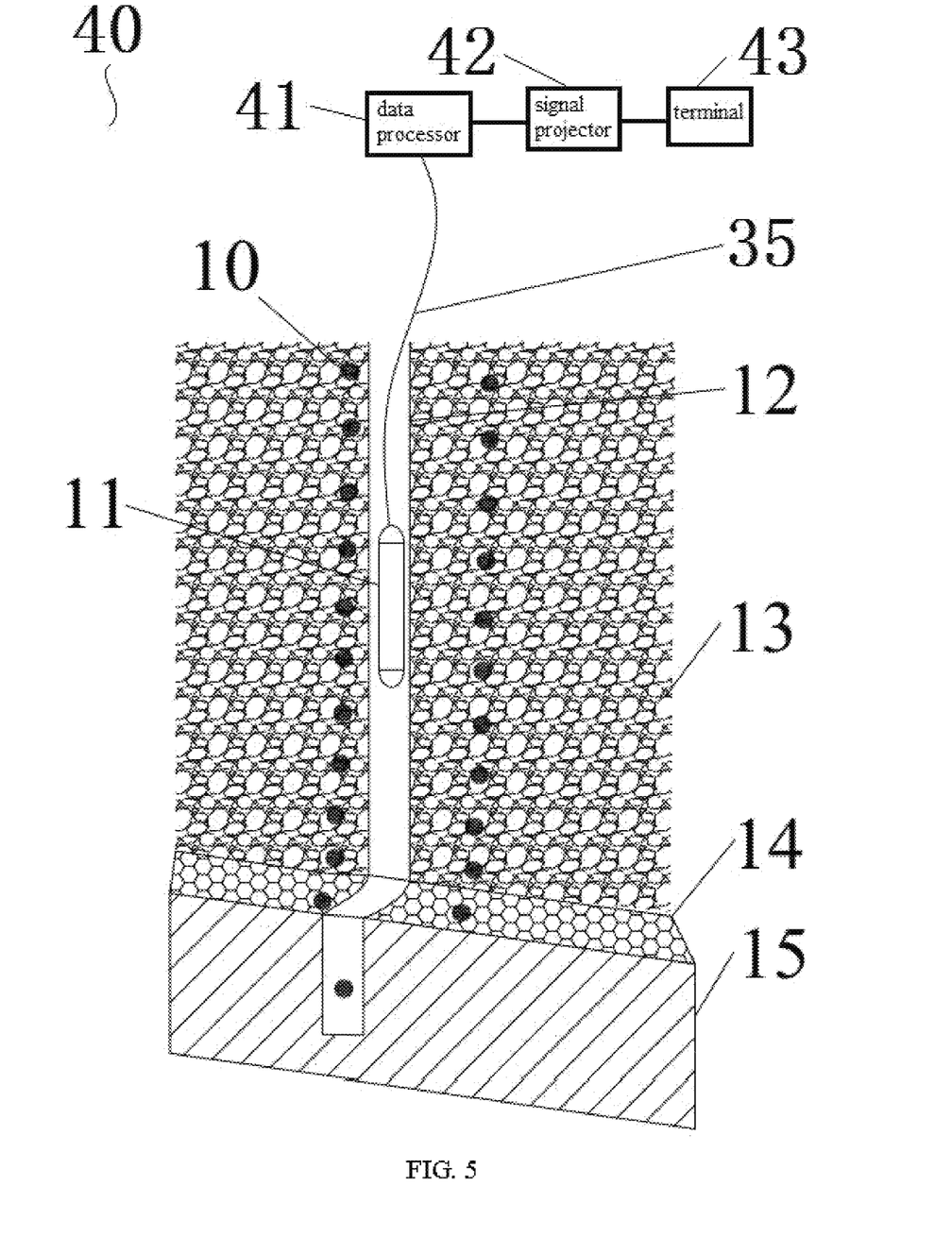
FIG. 5 is a schematic diagram of an exemplary device of responding the state of the slip mass in the prefabricated magnetic field according to some embodiments of the present disclosure.

FIG. 5 is a schematic diagram illustrating an exemplary device of responding the state of the slip mass in the prefabricated magnetic field according to some embodiments of the present disclosure. The device of responding the state of the slip mass in the prefabricated magnetic field may include the prefabricated magnetic field lay out device and a detection mechanism 40. The detection mechanism 40 may be configured to detecting spatial position of the permanent-magnet 10. The detection mechanism 40 may include an inclinometer 12 configured to store a permeameter 11 therein. The inclinometer 12 may be fixed in the drill hole 201, and materials similar to ground may be filled around the inclinometer 12 to keep environment of the drill hole 201 stable. The permeameter 11 is configured to detect magnetic signals of the permanent-magnets 10 at the preset monitoring points, a data processor 41 is configured to transform the magnetic signals of the permanent-magnets 10 into digital signals, a signal projector 42 is configured to transmit the digital signals to a terminal 43, and the terminal 43 configured to confirm the spatial position of each permanent-magnet 10. The permeameter 11 may be connected with one or more data processors 41 and signal projectors 42 which may be outside the drill hole 201 through a communication cable 35.

Figure 6:
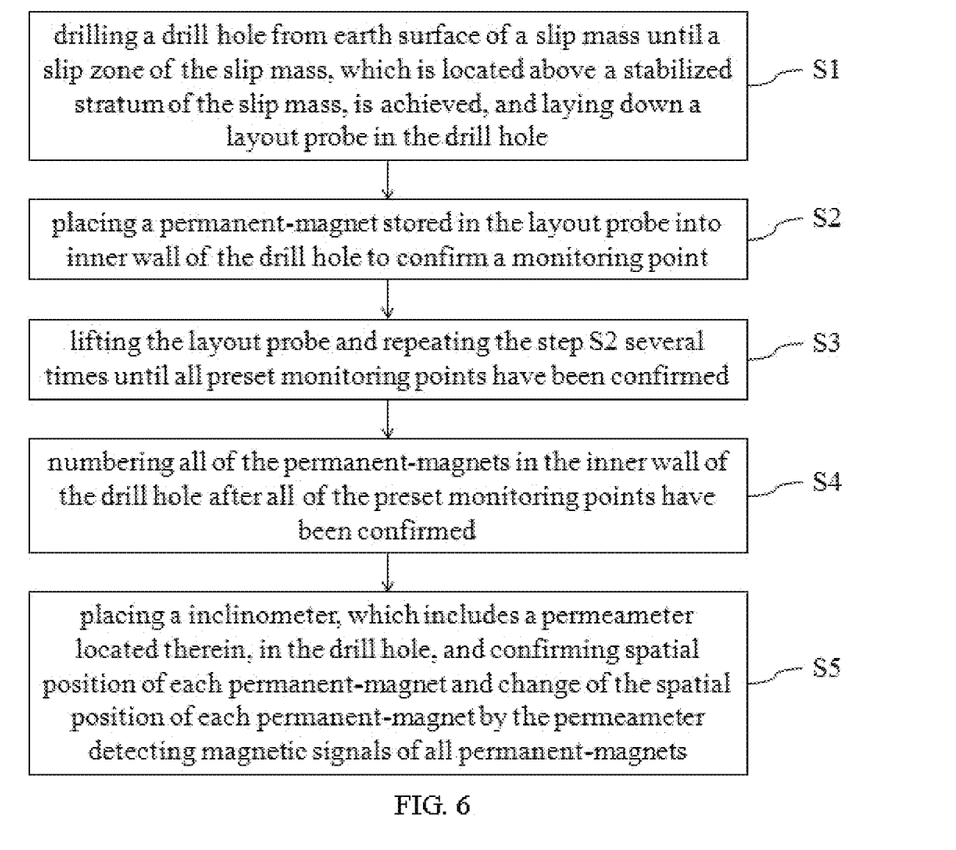
FIG. 6 is a flowchart illustrating an exemplary process for monitoring state of the slip mass in the prefabricated magnetic field according to some embodiments of the present disclosure.

FIG. 6 is a flowchart illustrating an exemplary process/method for responding the state of the slip mass in the prefabricated magnetic field according to some embodiments of the present disclosure. The process and/or method may be executed by the response device of the state of the slip mass in the prefabricated magnetic field as exemplified in FIG. 1, FIG. 2, FIG. 3, FIG. 4, FIG. 5 and the description thereof. The operations of the illustrated process/method presented below are intended to be illustrative. In some embodiments, the process/method may be accomplished with one or more additional operations not described, and/or without one or more of the operations discussed. Additionally, the order in which the operations of the process/method as illustrated in FIG. 6 and described below is not intended to be limiting.

In step S1, drilling a drill hole 201 from earth surface of a slip mass 13 until a slip zone 14 of the slip mass 13, which is located above a stabilized stratum 15 of the slip mass 13, is achieved, and laying down the layout probe 8 in the drill hole 201 by the traction mechanism 2 controlled by the control mechanism 5 until the layout probe 8 is located on the slip zone 14, wherein a position of the slip zone 14 is confirmed by digital sequence mark of the plastic ring 3.

In step S2, placing the permanent-magnet 10 stored in the layout probe 8 into the inner wall of the drill hole 201 by the layout mechanism 39 of the layout probe 8 as describe above to confirm a monitoring point.

In step S3, lifting the layout probe 8 and repeating the step S2 several times until all preset monitoring points have been confirmed. The layout probe 8 may be lifted to a constant distance every time by the traction mechanism 2 which is controlled by the control mechanism 5. In some embodiments, the layout probe 8 may be lifted to 0.5 meter every time.

In step S4, numbering all of the monitoring points (permanent-magnets 10) after all of the preset monitoring points has been confirmed. If the cartridge 29 is empty (the permanent-magnets 10 in the layout probe 8 is used up), the layout probe 8 may be lifted from the drill hole 201, and some permanent-magnets 10 may be placed in the cartridge 29, and the layout probe 8 may be lay down to the same position before it was lifted.

In step S5, placing the inclinometer 12, which includes a permeameter 11 located therein, in the drill hole 201, and filling materials similar to ground around the inclinometer 12 to keep environment of the drill hole 201 stable, confirming spatial position of each permanent-magnet 10 and change of the spatial position of each permanent-magnet 10 by the permeameter 11 detecting magnetic signals of all of permanent-magnets 10, wherein the magnetic signals of the permanent-magnets 10 may be transformed into digital signals by the data processor 41, the digital signals may be transmitted to the terminal 43, and the spatial position of each permanent-magnet 10 may be confirmed by the terminal 43. In some embodiments, a magnetic localization algorithm may be used to confirm the spatial position of each permanent-magnet 10 by the terminal 43. The change of the spatial position of each preset monitoring point may be confirmed based on the change of the spatial position of each permanent-magnet 10.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps may be added elsewhere in the exemplary process/method.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wire line, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A device for laying out a prefabricated magnetic field, comprising:
    a traction mechanism, which is set outside a drill hole, configured to lift or lay down a layout probe to one or more preset positions in the drill hole;
    the layout probe, which is set in the drill hole, configured to lay out one or more monitoring points, the layout probe comprising a circuit board and at least one set of layout mechanism, the set of layout mechanism comprising a cartridge configured to store at least one permanent-magnet, a screw pole configured to transmit the permanent-magnet, an electromagnet configured to attract the permanent-magnet, a driving mechanism configured to drive the screw pole to rotate, and a pressing mechanism configured to move the electromagnet, wherein the cartridge comprises a transmission slot aligned with the screw pole and a cartridge nozzle aligned with the electromagnet, wherein the pressing mechanism is fixed above the screw pole and connected with the electromagnet; and
    a control mechanism, which is set outside the drill hole, configured to perform operations comprising:
    driving the screw pole to rotate by controlling the driving mechanism, which makes permanent-magnets rise upwardly in the transmission slot, and an uppermost permanent-magnet is discharged from the cartridge nozzle and is attracted by the electromagnet by electrifying the electromagnet; and
    pushing the electromagnet outward by controlling the pressing mechanism, which makes the permanent-magnet be pressed in inner wall the drill hole.

2. The device of claim 1, wherein the traction mechanism is an electric winch, which is electrically connected with the control mechanism.

3. The device of claim 1, wherein the traction mechanism comprises a traction rope configured to connect with the layout probe, and wherein the traction rope comprises one or more digital sequence marks.

4. The device of claim 3, wherein the pressing mechanism is a hydraulic jack, which is connected with a hydraulic oil pump through a hydraulic tubing, wherein the hydraulic oil pump is electrically connected with the control mechanism, and wherein the control mechanism moves the pressing mechanism forwardly or backwardly by controlling the hydraulic oil pump.

5. The device of claim 4, wherein the circuit board is connected with the control mechanism via a control cable.

6. The device of claim 5, wherein the digital sequence mark is a plastic ring, and wherein the plastic ring rings the traction rope, the hydraulic tubing and the control cable.

7. The device of claim 6, wherein two adjacent plastic rings are evenly spaced on the traction rope.

8. The device of claim 1, wherein the cartridge is a hollow tube, and wherein a bullet hole is defined in middle part of the hollow tube.

9. The device of claim 1, wherein a spring is fixed at bottom of the cartridge, and wherein a supporting plate is fixed on an upper free end of the spring.

10. The device of claim 9, wherein an upper end of the cartridge is the cartridge nozzle, wherein a plurality of permanent-magnets is filled between the supporting plate and the cartridge nozzle.

11. The device of claim 1, wherein the layout probe comprises three sets of layout mechanisms, and wherein the three pressing mechanisms of the three sets of layout mechanisms are distributed evenly around a circle.

12. The device of claim 1, wherein an electromagnetic relay is installed on the circuit board, wherein the electromagnetic relay is connected with the electromagnet, and wherein the circuit board electrifies the electromagnet via the electromagnetic relay and the permanent-magnet is attracted by the electromagnet.

13. The device of claim 1, wherein the driving mechanism is a slow turning motor which is connected with the circuit board.

14. A device for responding state of a slip mass in a prefabricated magnetic field, comprising:
    a traction mechanism, which is set outside a drill hole, configured to lift or lay down a layout probe to one or more preset positions in the drill hole;
    the layout probe, which is set in the drill hole, configured to lay out one or more monitoring points, wherein the layout probe comprises a circuit board and at least one set of layout mechanism, wherein the set of layout mechanism comprises a cartridge configured to store at least one permanent-magnet, a screw pole configured to transmit the permanent-magnet, an electromagnet configured to attract the permanent-magnet, a driving mechanism configured to drive the screw pole to rotate and a pressing mechanism configured to move the electromagnet, wherein the cartridge comprises a transmission slot aligned with the screw pole and a cartridge nozzle aligned with the electromagnet, wherein the pressing mechanism is fixed above the screw pole and connected with the electromagnet; and a control mechanism, which is set outside the drill hole, configured to perform operations comprising:

driving the screw pole to rotate by controlling the driving mechanism, which makes permanent-magnets rise upwardly the transmission slot, and an uppermost permanent-magnet is discharged from the cartridge nozzle and is attracted by the electromagnet by electrifying the electromagnet; and pushing the electromagnet outward by controlling the pressing mechanism, which makes the permanent-magnet be pressed in inner wall the drill hole;

a detection mechanism, configured to detecting spatial position of the permanent-magnet, wherein the detection mechanism comprises an inclinometer configured to store a permeameter, the permeameter configured to detect magnetic signals of the permanent-magnets at the preset monitoring points, a data processor configured to transform the magnetic signals of the permanent-magnets into digital signals, a signal projector configured to transmit the digital signals to a terminal, and the terminal configured to confirm the spatial position of each permanent-magnet.

* * * * *